United States Patent

Belamaric

[11] Patent Number: 4,554,430
[45] Date of Patent: Nov. 19, 1985

[54] ELECTRICAL POWER SOURCE FOR RESISTANCE WELDING APPARATUS

[75] Inventor: Zelimir Belamaric, Pully, Switzerland

[73] Assignee: L. Schuler GmbH, Fed. Rep. of Germany

[21] Appl. No.: 457,628

[22] Filed: Jan. 13, 1983

[30] Foreign Application Priority Data

May 13, 1981 [DE] Fed. Rep. of Germany..PCT/DE82/00097

[51] Int. Cl.4 ............................................. B23K 11/24
[52] U.S. Cl. ..................................... 219/108; 219/64; 219/110; 363/71
[58] Field of Search ......................... 219/108, 110, 64; 363/71, 72

[56] References Cited

U.S. PATENT DOCUMENTS

| 3,636,298 | 1/1972 | Riberg et al. | 219/108 |
| 3,708,739 | 1/1973 | Kohler et al. | 363/71 |
| 3,893,015 | 7/1975 | Weil | 363/71 |
| 4,149,233 | 4/1979 | Nagano | 363/71 |
| 4,176,392 | 11/1979 | Cronin et al. | 363/71 |
| 4,222,098 | 9/1980 | Nagano | 363/71 |

FOREIGN PATENT DOCUMENTS

| 0033962 | 8/1981 | European Pat. Off. |
| 1613730 | 5/1971 | Fed. Rep. of Germany |
| 2336429 | 7/1973 | Fed. Rep. of Germany |

Primary Examiner—Clifford C. Shaw
Attorney, Agent, or Firm—Craig and Burns

[57] ABSTRACT

An electrical energy source with a static inverter and a welding transformer (12) for a resistance welding machine comprises a first static frequency converter (10) made up of semiconductor elements, the alternating output voltage of which has a frequency and pulse shape which differ from the frequency and pulse shape of the supply voltage fed to the inverter. In this connection, the pulse shape, the amplitude, and the pulse to space ratio are to be variable within wide limits. This is attained by at least one second frequency converter (11) connected in parallel to the first frequency converter (10), wherein the alternating output voltage of the second frequency converter (11) is adapted to be added in phase synchronism to the alternating output voltage of the first frequency converter (10) in the primary circuit of the welding transformer (12).

9 Claims, 3 Drawing Figures

ELECTRICAL POWER SOURCE FOR RESISTANCE WELDING APPARATUS

The invention relates to a source of electrical energy with a static inverter and a welding transformer for a resistance welding machine, using a first static frequency converter made up of semiconductor elements, the alternating output voltage of which has a frequency and pulse shape which differ from the frequency and pulse shape of the supply voltage fed to the inverter.

Such a power source has been disclosed in DOS No. 1,613,730. This source of energy produces relatively high frequency welding currents, the pulse shape of which approximates a rectangle and/or a square. However, the device operates satisfactorily only to a limited extent since the pulse shape can be affected only within narrow limits. No regulation of the welding energy transferred is provided in the known energy source.

Starting with this state of the art, the invention is based on providing an electrical power source wherein the pulse shape, the amplitude, and the pulse-space ratio of the welding current can be varied within wide limits and can meet the relevant requirements during the welding operation.

According to the invention, this object is achieved in that at least one second frequency converter is connected in circuit with the first frequency converter, and in that the alternating output voltage of the at least second frequency converter is adapted to be added, in phase synchronization, to the alternating output voltage of the first frequency converter in the primary circuit of the welding transformer.

It is another object of the invention to produce an electrical energy source with a static inverter and a welding transformer having first and second converters wherein the amplitude of the alternating ouput voltages of the frequency converters are variable.

It is another object of the invention to produce an electrical energy source for welding having plural frequency converters wherein at least one frequency converter is variable and the amplitude of the alternating output voltage of additional frequency converters is constant.

It is another object of the invention to produce an electrical energy source for welding having plural frequency converters wherein the amplitudes of the alternating output voltages of the coverters are constant.

It is another object of the invention to produce an electrical energy source for welding having plural frequency converters wherein pulse to space ratios of alternating ouput voltages of the frequency converters are variable.

It is another object of the invention to produce an electrical energy source for welding having plural frequency converters wherein pulse shapes of alternating output voltages of the frequency converters are rectangular.

It is another object of the invention to produce an electrical energy source for welding having plural frequency converters and further having a secondary circuit of a welding transformer wired to a measured value transducer, the output signal of which is proportional to the actual value of the welding current being fed to a welding current regulator and that the ouput of the welding current regulator produces a setting signal connected as an input to the frequency converters.

It is another object of the invention to produce an electrical energy source for welding having plural frequency converters wherein the primary circuit of a welding transformer is wired to a measured value transducer, the output signal of which is proportional to the actual value of a welding current fed to a welding current regulator and that the output of the welding current regulator produces a setting signal which is used as an input to the frequency converters.

It is another object of the invention to produce an electrical energy source for welding having plural frequency converters wherein a welding transformer is designed for a lower transferrable limit frequency which is determined essentially by the ratio of conveying speed to length of edge and that dimensions of the metal sheeting of soft magnetic material are within a range such as to permit determination of the operating point on the characteristic magnetic curve in the B/H diagram at a beginning of a linear zone.

By constructing the source of energy with at least two similar frequency converters, the alternating output voltages of which can be added in phase synchronization in the primary circuit of a welding transformer, it is possible to obtain pulse shapes having very steep flanks. This makes it possible to provide an exact starting point for the welding step and an accurate activation of the end of the welding operation. Furthermore, the great steepness of the flanks of the welding current rise in the secondary circuit of the welding transformer permits welding at a very low frequency even at high production rates. The time required for reversing the welding current is negligible so that the frequency has almost no effect on the quality of the weld seam. By the selection of a low frequency for the welding current (below $f_s = 100$ Hz), inductive eddy-current losses are extensively eliminated.

Current regulation is effected by wiring the secondary circuit of a welding transformer to a measured value transducer, the output signal of which is proportional to the actual value of the welding current ($i_2$), the signal being fed to a welding current regulator, the output of which is transmitted as a setting signal to the plural frequency converters. The primary circuit of the welding transformer is wired to a measured value transducer, the output signal of the transducer being proportional to the actual value of the welding current ($i_2$) which is fed to a current regulator, the ouput thereof being transmitted as a setting signal to the plural frequency converters. The current regulation thereby permits an accurate metering of the welding energy.

Since the frequency converters are of similar design, it is a simple matter to connect as many frequency converters in parallel as are necessary for a rapid increase in current and/or for a rapid reversal.

These and other objects, features, and advantages of the present invention will become more apparent from the following description when taken in connection with the accompanying drawing which shows, for the purposes of illustration only, one embodiment in accordance with the present invention, and wherein.

Figure 1:
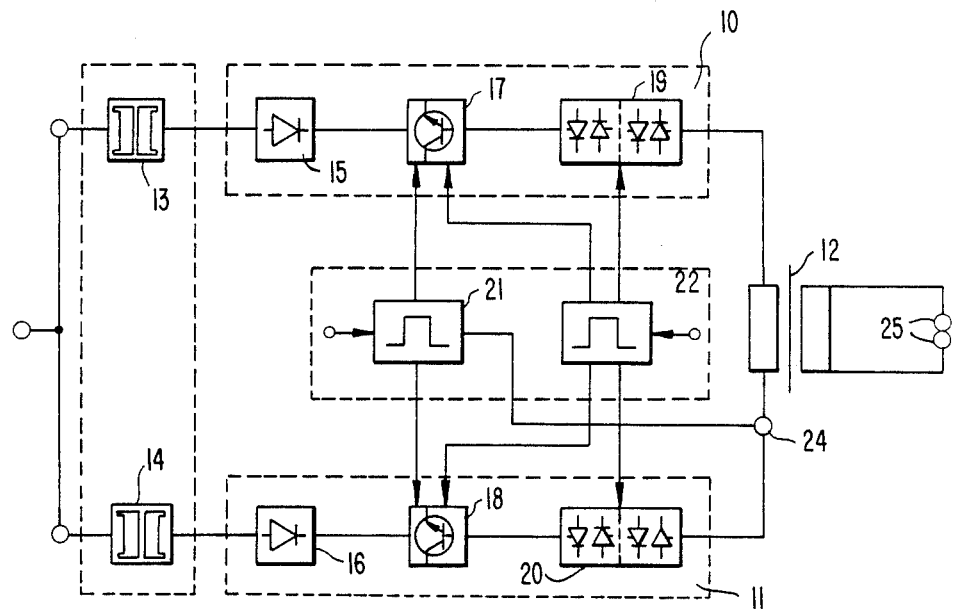
FIG. 1 shows a first embodiment of the invention with feedback loop in the primary circuit of a transformer.

Turning now to a consideration of the figures, wherein like reference numerals represent like elements, and more particularly to FIG. 1, an electrical energy source is shown built up in principle of a first frequency converter 10 and a second frequency converter 11. The outputs from the two frequency converters 10, 11 are connected to the primary circuit of a welding transformer 12, while the inputs thereof are connected to a mains voltages of, for example, 3×380 V three-phase current. The mains voltage passes via isolating transformers 13, 14 to conventional rectifying bridges 15, 16, producing a direct voltage, by means of which the actual DC to AC inverter stages are supplied, these stages each consisting of a transistor control stage 17, 18 and a thyristor power stage 19, 20. THe structure and operation of the two last-mentioned stages are basically known from DOS. No. 2,336,429.

Figure 1A:
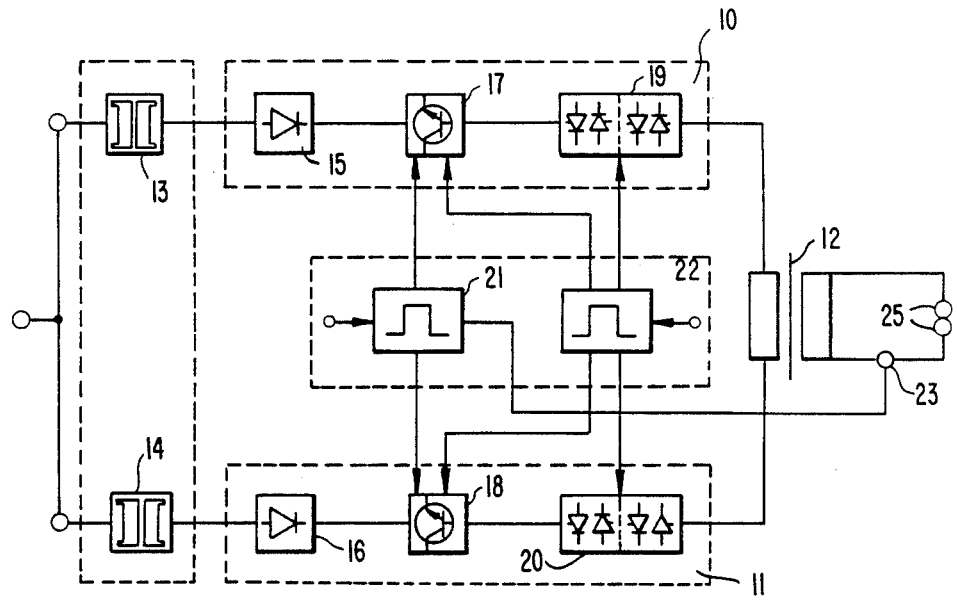
FIG. 1a shows another embodiment of the invention with a feedback loop originating in the secondary of the welding transformer.

The power source of this invention furthermore comprises a welding current regulator 21 and a frequency regulator 22, which are components of an electronic control system not shown in detail. The welding current regulator 21 is connected to a feedback loop permitting determination of an actual current value in the primary circuit by way of a measured value transducer 24. Determination of an actual current value may also be effected by way of a measured value transducer 23 in the secondary circuit as shown in FIG. 1a. According to the setting, the frequency regulator 22 determines the frequency of the welding current flowing via electrode rollers 25 and the interposed material to be welded, not illustrated in the drawing.

The operating principle of a source of energy as described hereinabove will be explained with the aid of FIG. 2.

Figure 2A:
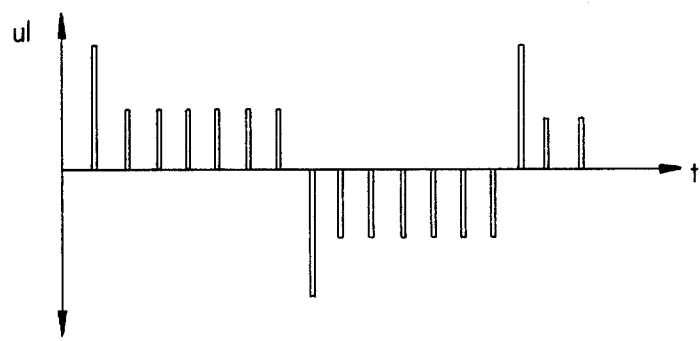
FIG. 2 shows voltage and current diagrams related to the operation of the invention.
Figure 2B:
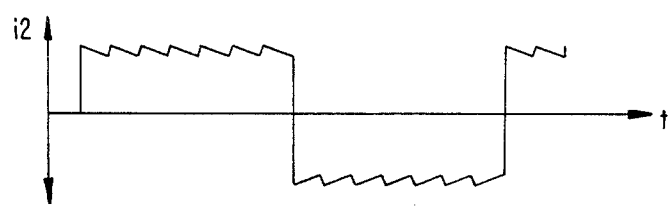

In the diagram of FIG. 2a, the voltage $u_1$ applied to the primary circuit of the welding transformer 12 is illustrated, while FIG. 2b shows the associated welding current $i_2$ in the secondary circuit of the welding transformer 12. A voltage pulse of specific length and amplitude can be produced by one of the frequency converters 10, 11. The phase-synchronous addition of two such voltage pulses gives, in the present example, the point at which the welding current $i_2$ begins to flow in the secondary circuit. The welding current reaches its set amplitude in a very brief time period and this amplitude is kept constant by way of the welding current regulator 21. In order to maintain the welding current at constant value during a half-wave, frequency converters 10, 11 produce alternate voltage pulses generating, in the secondary circuit, a modulation, which is slight according to amplitude, of the welding current $i_2$ of relatively high frequency. After elapse of the first half-wave of the rectangular welding current $i_2$, both frequency converters 10, 11 are again connected in phase synchronism and additively to the primary circuit of the welding transformer 12 (see FIG. 2a) so that a reversal of the welding current $i_2$ takes place within a negligibly brief period of time.

The further operation can be derived at this point from the preceding disclosure.

The energy source according to this invention makes it possible to produce welding currents of an almost direct-current character in relation to an edge to be welded, i.e. which are also suitable for conducting the process of European Patent Application No. 81100873.9. In this connection, the construction of the welding transformer according to this invention 12 is designed for a lower transferrable limit frequency determined essentially by the ratio of the welding speed to the length of the edges and the dimensions of the metal sheeting of shift magnetic material are within a range such as to prevent determination of the operation point on the characteristic magnetic curve in the B/H diagram at the beginning of the linear zone. Welding currents having a higher frequency, for example mains frequency, can also be generated wherein the influence of the frequency of the welding current on the quality of the weld seam, as a function of the production rate (welding speed), is without significance.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

I claim:

1. For a resistance welding machine, an electric energy source having
   a static inverter comprising
   a first static frequency converter means producing a first sequence of voltage impulses,
   at least a second static frequency converter means producing a second sequence of voltage impulses, the second sequence alternating in time with and opposite in polarity to the first sequence,
   each of the first and the at least second frequency converter means comprising a direct-current bridge stage, and a thyristor output stage means, each thyristor output stage means, on the input side, connected to an output of a frequency regulator and an output of a welding current regulator,
   plural welding electrodes,
   welding transformer means comprising a secondary circuit means and a primary circuit means receiving said fist and second sequences of voltage impulses
   whereby the last impulse of a sequence of one polarity and the first impulse of the immediately succeeding sequence of another polarity are combined in order to produce steep leading edges of half-wave current impulses passing through the secondary circuit means to the plural welding electrodes.

2. An electrical energy source according to claim 1, wherein the first and second frequency converter means comprise respectively first and second frequency converter means for generating alternating output voltages of variable amplitude.

3. An electrical energy source according to claim 1, wherein the first frequency converter means comprises first frequency converter means for generating an alternating output voltage of variable amplitude and
   said second frequency converter means comprises at least second frequency converter means for generating an alternaing output voltage of constant amplitude.

4. An electrical energy source according to claim 1, wherein the first and second frequency converter comprise first and second frequency converter means for generating respective output voltages of constant amplitude.

5. An electrical energy source according to claim 1, wherein the first and second frequency converter means comprise, respectively, first and second frequency converter means for generating alternating output voltages having variable pulse to space ratios.

6. An electrical energy source according to claim 1, wherein the first and second frequency converter means comprise, respectively, first and second frequency converter means for generating alternating output voltages having rectangular pulse shapes.

7. An electric energy source according to claim 1, permitting accurate metering of welding energy, wherein a secondary circuit means of the welding transformer comprises means, the ouput signal of which, being proportional to the actual value of the welding current, $(i_p)$ is fed to the welding current regulator.

8. An electric energy source according to claim 1, permitting accurate metering of welding energy, wherein a primary circuit of the welding transformer comprises a transducer means, the output signal of which, being proportional to the actual value of the welding curretn $(i_2)$ is fed to the welding current regulator.

9. An electrical energy source according to claim 1, wherein plural edges of predetermined length are to be welded at a predetermined welding speed and the welding transformer means comprises welding transformer means designed for a lower transferrable limit frequency determined by the ratio of said welding speed to said edge length, and the dimensions of the metal sheeting of soft magnetic material are within a range wherein the operating point is established on the characteristic magnetic curve in a B/H diagram at the beginning of the linear zone thereof.

* * * * *